J. C. ESTREM.
TRACTION DEVICE.
APPLICATION FILED MAY 19, 1909.
950,442.
Patented Feb. 22, 1910.
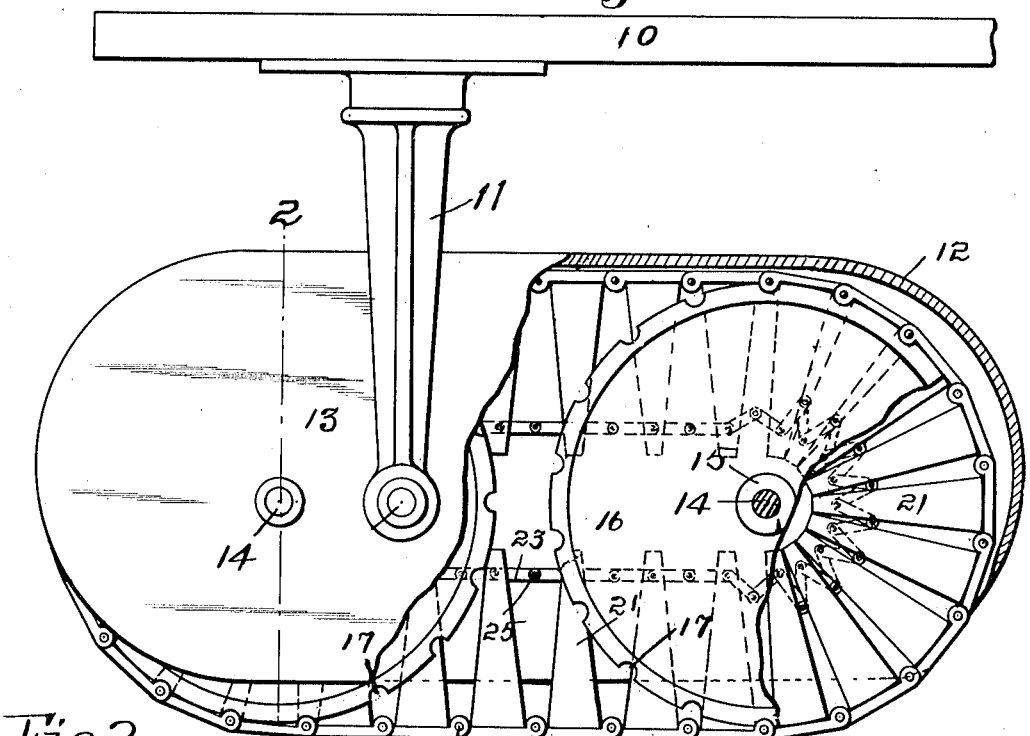
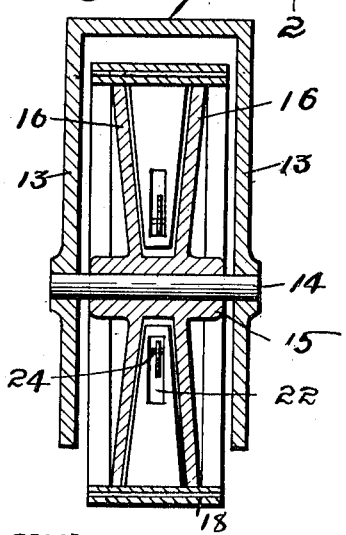
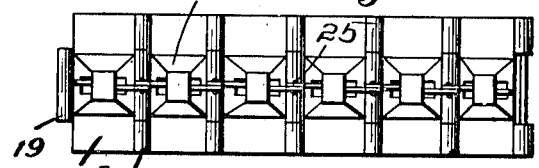
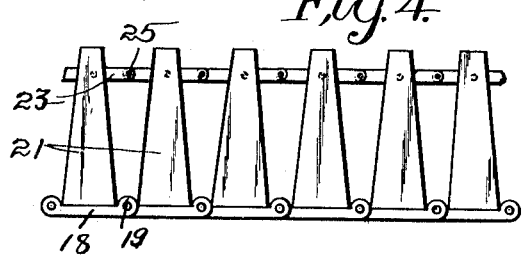
Witnesses
F. C. Caswell
A. G. Hague
Inventor
John C. Estrem
by Quigg & Lane Atty's

UNITED STATES PATENT OFFICE.

JOHN C. ESTREM, OF DECORAH, IOWA.

TRACTION DEVICE.

950,442.

Specification of Letters Patent.  Patented Feb. 22, 1910.

Application filed May 19, 1909. Serial No. 496,890.

*To all whom it may concern:*

Be it known that I, JOHN C. ESTREM, a citizen of the United States, residing at Decorah, in the county of Winneshiek and State of Iowa, have invented a certain new and useful Traction Device, of which the following is a specification.

The object of my invention is to provide a traction device consisting of broad, flat plates pivotally connected with each other to form an endless chain designed to travel around two wheels and so arranged that all of the flat plates at the lower portion of the device will rest firmly in engagement with the ground surface over which the device is traveling, so that the device may readily and easily move over soft or uneven ground surfaces.

More specifically, it is my object to provide a device of this kind in which the flat plates between the wheels are firmly and securely held in line with each other so that they serve to support the weight resting on the traction device as well as the flat plates that are directly beneath the wheels.

A further object is to provide a frame for inclosing all of the traction device except the part that is designed to stand in engagement with the ground surface, and also to provide means for supporting a vehicle or weight at a point adjacent to the rear wheel so that the front wheel may be raised or lowered easily when passing over uneven road surfaces.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a complete device embodying my invention, part of the inclosing frame and part of the forward wheel being broken away to show the interior construction. Fig. 2 shows a sectional view on the line 2—2 of Fig. 1. Fig. 3 shows a top or plan view of a number of the traction plates connected together, and Fig. 4 shows a side elevation of same.

Referring to the accompanying drawings, I have used the reference numeral 10 to indicate a vehicle body. Connected with the vehicle body are the arms 11 extended downwardly therefrom.

The entire traction device is contained within a suitable casing consisting of a top 12 and sides 13. At each end of the casing is a rotatable axle 14 upon which a hub 15 is fixed. This hub is provided with two flanges 16 arranged on divergent angles so that the space between the flanges is widest at the peripheries of the flanges. At a point a short distance in advance of the rear axle, the arms 11 are pivoted to the sides 13 as shown in Fig. 1, so that if the front of the traction device should pass over a raised obstruction in the roadway the front could readily tilt upwardly to ride over said obstruction. In the peripheries of the flanges 16 is a series of notches 17 for purposes hereinafter made clear.

The endless traction device comprises a series of traction plates 18 having at their adjacent edges the rounded hinge members 19. The said plates have their hinged members connected by suitable pintles 20 and the plates are of such width that their side edges will rest upon the peripheries of the flanges 16 as clearly shown in Fig. 2. Formed integral with each of the plates is a tapered angular extension 21, said extensions being of a size and shape to loosely enter between the flanges 16 when the plates 18 are in engagement with said flanges. Near the smaller end of the extensions 21 is an opening 22 and extended from these openings 22 is a series of links 23, said links being of such length that they may be connected by the pivot pins 24 with the extensions 21 and also by the pivot pins 25, arranged midway between two adjacent extensions.

In practical use and assuming that the traction device is being advanced over a road-way, it is obvious that the traction plates 18 that are arranged midway between the ends of the device will rest upon the roadway and support the weight of the traction device equally with the plates that are directly under the flanges 16 for the reason that the links 23 that are connected to said central plates will be arranged in a straight line as shown in Fig. 1 and will be firmly held in said position, thereby providing a rigid support for the extensions 21 to prevent them from tilting forwardly or rearwardly in either direction.

When the extensions 21 are passing around either of the flange wheels at the ends of the traction device, then the links will fold between the extensions 21 in the manner shown in Fig. 1, and therefore the traction plates and the extensions thereon may pass around the wheels at the ends of the device with a comparatively slight amount of friction. The said plates are prevented from slipping relative to the flanges 16 by means of the rounded hinge members 19 entering the notches 17.

One of the advantageous features of my invention is that the entire traction device is supported within and protected by an inclosing casing which casing provides means for supporting a vehicle on the traction device; and by pivoting the arms 11 to the casing at a point nearer the rear axle 14 than the front axle, I have provided a means by which the front end of the traction device may readily and easily be elevated when the traction device is passing over a raised obstruction, and yet when the device is traveling over a level roadway, the weight will be distributed upon the entire number of traction plates that are in engagement with the roadway.

It is obvious that by the construction shown, the distance between the forward and rear wheels may be regulated to meet the requirements, and the traction plates that are between the wheels will support a considerable portion of the load and yet the said central traction plates will be permitted a limited movement such as is desirable for adapting the plates to uneven road surfaces.

I claim as my invention.

1. An improved traction device, comprising a casing, two axles mounted in the casing, a wheel on each axle, comprising two divergent flanges, a series of traction plates hinged together and extending around the wheels, and in engagement with the peripheries of said flanges, a tapered angular extension on each plate, designed to loosely enter between the flanges, a link pivoted to each extension near its inner end, said links being pivoted together between the extensions, and said links being so arranged that they will stand in line with each other when the traction plates are in position between the wheels to thereby prevent lateral movement of the extensions.

2. An improved traction device, comprising a casing, two axles mounted in the casing, a wheel on each axle, comprising two divergent flanges, a series of traction plates hinged together and extending around the wheels, and in engagement with the peripheries of said flanges, a tapered angular extension on each plate, designed to loosely enter between the flanges, a link pivoted to each extension near its inner end, said links being pivoted together between the extensions, and said links being so arranged that they will stand in line with each other when the traction plates are in position between the wheels to thereby prevent lateral movement of the extensions, the peripheries of said flanges being provided with notches, and the said traction plates being provided with rounded hinged members to enter said notches.

Des Moines, Iowa, June 1, 1908.

JOHN C. ESTREM.

Witnesses:
Ida Corsen Estrem,
Willard Halverson.